UNITED STATES PATENT OFFICE 2,355,659

PIPERIDINE DERIVATIVES AND PROCESS FOR THE MANUFACTURE OF THE SAME

John Lee, Nutley, and Werner Freudenberg, Cranford, N. J., assignors to Hoffmann-La Roche, Inc., Nutley, N. J., a corporation of New Jersey No Drawing. Application December 15, 1939, Serial No. 309,480

12 Claims. (Cl. 260—293)

The present invention relates to the manufacture of substances corresponding to the general formula

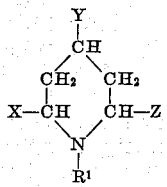

and their salts. In such formula $R^1$ is a hydrogen, a lower alkyl, hydroxy-alkyl, or alkoxy-alkyl radical, X is a radical of the structure

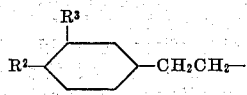

wherein $R^2$ is a lower alkyl, lower alkoxy or hydroxy radical, and $R^3$ is hydrogen, a lower alkyl, lower alkoxy or hydroxy radical, or both $R^2$ and $R^3$ together form a methylenedioxy group, and one of the radicals Y and Z is hydrogen and the other is a radical of the structure

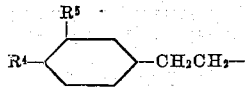

wherein $R^4$ is a lower alkyl, lower alkoxy or hydroxy radical and $R^5$ is hydrogen, a lower alkyl, lower alkoxy or hydroxy radical, or both $R^4$ and $R^5$ together form a methylenedioxy group.

The products are designed for use in therapy substances having pronounced spasmolytic and analeptic activity. This activity is shown for example in the compound 1-methyl-2,6-di(p-methoxyphenylethyl)-piperidine hydrochloride, corresponding to the formula

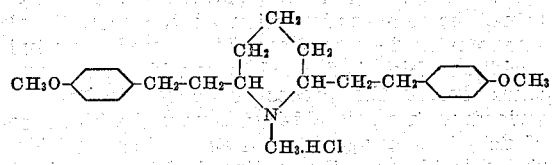

which has a spasmolytic action five times as strong as that of papaverine, with a toxicity of the same order. In the isolated guinea pig intestine, the material is active at one part in 4,000,000, and on isolated guinea pig uterus at one part in 500,000. 1 mg./kg. administered intravenously to a rabbit produces a definite stimulation of the respiratory frequency and minute volume. In mice narcotized with allyl isopropyl barbituric acid, subcutaneous doses of 50 mg./kg. produce a marked wakening effect. The subcutaneous toxicity in mice is around 250 mg./kg., the intravenous toxicity around 18 mg./kg. Similar activities are displayed by the compounds shown in the examples.

Clinically, the materials are useful in the treatment of various respiratory embarrassments, such as bronchial asthma and angina pectoris. They are preferably employed in the form of their salts, which are soluble in water, such as the hydrochloride, hydrobromide, hydroiodide, phosphate, sulfate, tartrate, malate, citrate, ethanesulfonate or methanesulfonate. These can be suitably given orally and, in the case of the most soluble salts, parenterally.

The compounds are preferably prepared by condensing one mol 2,4- or 2,6-dimethyl pyridine with 2 mols of a hydroxy-benzaldehyde, an alkoxy-benzaldehyde, dialkoxy-benzaldehyde, alkyl-benzaldehyde, dialkyl-benzaldehyde, hydroxy-alkoxy-benzaldehyde, alkyl-alkoxy-benzaldehyde or methylenedioxy-benzaldehyde. Specifically suitable benzaldehydes are anisaldehyde, p-ethoxy-benzaldehyde, m- or p-tolualdehydes, vanillin, isovanillin, piperonal and m- or p-hydroxy-benzaldehydes. The resultant intermediate contains two phenethenyl radicals containing the same substituents. When final products are desired which contain phenylethyl radicals containing different substituents, 1 mol of 2,4- or 2,6-dimethyl pyridine is condensed with 1 mol of a substituted benzaldehyde, and after separation of the mono-phenethenyl derivative it is subjected to a second condensation reaction with a benzaldehyde containing different substituents. The reaction course in the preparation of the intermediate is as follows:

Step I

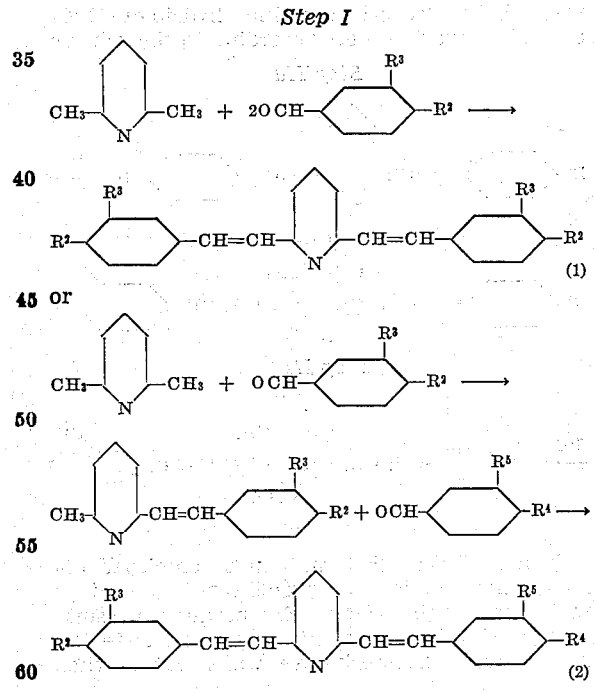

The resultant intermediate products can then be treated by either of two methods. They can be a. reacted with an alkyl, hydroxyalkyl, alkoxyalkyl or aralkyloxyalkyl-arylsulfonate, as for example, methyl, ethyl, propyl, hydroxyethyl, ethoxyethyl or benzoxyethyl p-toluene sulfonate, and the resultant product reduced with hydrogen in the presence of a hydrogenation catalyst, such as, platinum, palladium, nickel or copper chromite. This latter operation causes the saturation of the side chain and pyridine nucleus and hydrogenolysis of the p-methyl benzene sulfonyl group with the splitting of p-methyl toluene sulfonic acid. The reaction course is as follows:

*Step II*

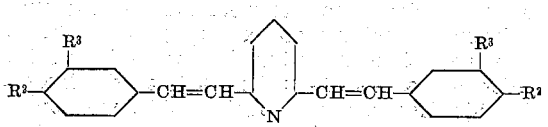

*Step III*

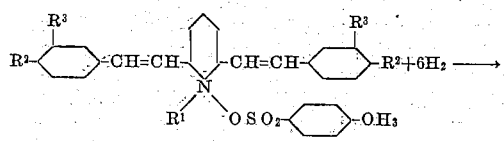

*Step IV*

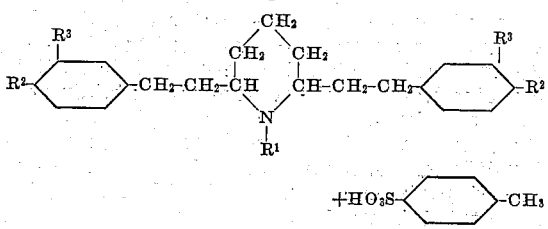

Alternatively, after Step I the resultant product can be b. hydrogenated in the presence of a hydrogenation catalyst to produce the 1-unsubstituted piperidine derivative which can then be alkylated with alkyl halide, ethylene chlorohydrin or ethylene chlorohydrin ethers according to the scheme

*Step IIa*

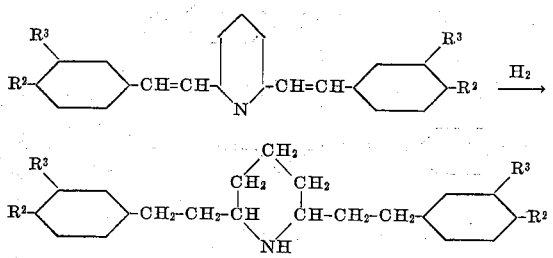

*Step IIIa*

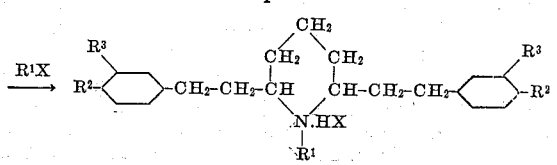

In Step I the reactants can be employed directly, the reaction being facilitated by heating with a condensing agent. The products are suitably purified by recrystallization to separate any monophenethenyl derivative, which can be then retreated with the same or a different aldehyde, depending upon the product desired.

In Step II the reaction can be performed with or without a solvent. The products are suitably purified by recrystallization.

Steps III and IIa are performed in a solvent which may be acid, neutral, or alkaline. With the noble metal catalysts acid or neutral solutions can be employed; with the base metal catalysts neutral or alkaline media are used. Acetic acid or alcohol forms a suitable solvent, in the respective cases. Step IIIa is performed with or without the addition of a solvent.

The method (a) is the preferred method since by this route the formation of quaternary ammonium compounds which occurs to some extent in step IIIa is avoided.

For the purpose of the preparation of salts the reaction products are basified with alkali hydroxides, and extracted with ether to give the parent base, which can then be treated with the equivalent amount of acid. Suitably for the preparation of the hydrochloride, the base is dissolved in ether and dry hydrochloric acid gas passed in. This precipitates the monohydrochloride, usually in pure form. From this the pure base can be liberated, which then can be transformed into the normal salts of monobasic acids, such as nitric, hydriodic, hydrobromic, acetic, lactic or normal or acid salts of dibasic or tribasic acids, such as tartaric acid, sulfuric acid, phosphoric acid, gluconic acid, citric acid, by treatment of a solution of the base with the equivalent proportions of the acid.

The reactions obtained in steps II, III and IV or IIa and IIIa are the same when employing intermediate (2) and are analogous to those above.

The reactions with 2,4-dimethyl pyridine are entirely analogous to the above.

The following examples illustrate the invention without limiting the invention thereto:

*Example 1*

24 g. of 2,6-dimethyl pyridine, 50 g. of acetic anhydride, and 60 g. of anisic aldehyde are heated in an oil bath and refluxed for sixty-six hours. On cooling, the residue solidifies. It is transferred to a Buchner funnel and washed with cold alcohol. The precipitate, only very slightly soluble in alcohol, is recrystallized from benzene or a mixture of benzene and alcohol. Yield 37 g. of 2,6-di-(p-methoxyphenethenyl)-pyridine, melting point 182–4°. Additional quantities can be obtained by the condensation of the monostyryl compound, 2 - p-methoxyphenethenyl-6-methyl pyridine, which is formed in considerable quantities during the process of condensation described, with anisic aldehyde under the influence of dehydrating agents such as acetic anhydride, zinc chloride, etc. The entire yield thus obtained amounts to 47 g., which is 61% of the theory.

1.9 g. of 2,6-di(-p-methoxyphenethenyl)-pyridine is dissolved in glacial acetic acid and hydrogenated, using platinum oxide as catalyst. After seven hours the hydrogenation is complete and the solution is filtered, evaporated in vacuo, and the crystalline residue dissolved in a little alcohol and cooled. The free base melting at 154–5° is obtained.

The free base is dissolved in ether, and hydrogen chloride gas introduced into the dry ethereal solution. Immediate crystallization of the hydrochloride takes place. The substance is recrystallized from alcohol and melts at 209–211°. It is 2,6-di(p-methoxyphenethyl)-piperidine hydrochloride, and corresponds to the formula

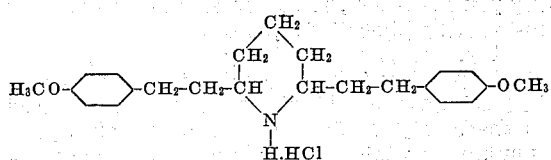

The base obtained from this material by basification on treatment with ethyl bromide gives the hydrobromide of the structure

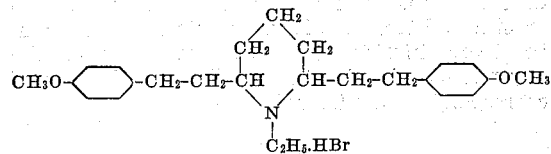

The corresponding base may be obtained by treating this salt with an alkaline reagent.

*Example 2*

90 g. of 2,6-di(p-methoxyphenethenyl)-pyridine obtained as described in Example 1 is refluxed for forty-two hours with 53 g. of methyl p-toluene sulfonate, the oil bath being kept between 160–80°. The residue solidifies completely. It is recrystallized from 500 cc. of methyl alcohol; the addition product melts with decomposition at 242–4°. Yield 230 g.

50 g. of 1-methyl-2,6-di(p-methoxyphenethenyl)-pyridinium toluene sulfonate is dissolved in 160 cc. of a mixture of acetic acid and alcohol 2:1. 3 g. of platinum oxide is used as catalyst, and the hydrogenation carried out at a pressure of 50 lbs./sq. in. The hydrogen consumption is theoretical, after approximately two hours. The catalyst is now filtered and the filtrate evaporated in vacuo, made alkaline by means of solid sodium carbonate, extracted with ether, and the ether solution dried with potassium carbonate. Into the filtered ethereal solution dry hydrogen chloride gas is passed, until the reaction is acidic to litmus paper. The precipitate, at first sirupy, becomes gradually solid on allowing to stand at low temperature. The pure material, recrystallized from alcohol and ether 2:1, melts at 176–8°. Yield 50% of the theory.

5 g. of 1-methyl-2,6-di(p-methoxyphenethenyl)-pyridinium toluene sulfonate is dissolved in 50 cc. of absolute alcohol and hydrogenated at higher than atmospheric pressure, using Raney nickel as a catalyst. The hydrogen consumption is theoretical after approximately three hours at 50 lbs. pressure. Using 1000 lbs. pressure, the hydrogen consumption is completed in a shorter period. The catalyst is now filtered, the filtrate evaporated in vacuo, made alkaline with sodium carbonate, extracted with ether, and the free base isolated and transformed into its hydrochloric acid salt as described above. The recrystallized pure material melts at 176–8°. Yield between 40 and 50% of the theory. Mixed with the material described in the platinum oxide hydrogenation no depression in melting point was observed. Both materials are 1-methyl-2,6-di(p-methoxyphenethyl)-piperidine hydrochloride and correspond to the formula

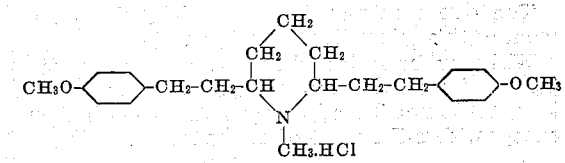

The free base may be obtained by the treatment of this salt with an alkaline reagent.

*Example 3*

10 g. of dimethyl pyridine, 30 g. of piperonal and 20 g. of acetic anhydride are refluxed in an oil bath for twenty hours, the temperature being kept between 150 and 160°. The reaction mixture transferred as such to the ice-box, deposited after a short time 4.35 g. of condensation product, which after crystallization from benzene gave a correct analysis for 2,6-di(3,4-methylenedioxy-phenethyl)-pyridine.

2 g. of 2,6-di(3,4-methylenedioxy-phenethenyl)-pyridine are dissolved in 30 cc. of hot glacial acetic acid and reduced in an atmosphere of hydrogen, using 100 mg. of platinum oxide as catalyst. The theoretical absorption is complete in three hours. The solution is evaporated in vacuo after removal of the catalyst by filtration, and the residue made alkaline by means of sodium carbonate, extracted with ether and the ethereal solution of the free base dried by means of potassium carbonate. Into this solution a stream of dry hydrochloric acid gas is passed, causing immediate precipitation of the crystalline hydrochloride, which melts after repeated crystallizations from methyl or ethyl alcohol at 168–70°. The material corresponds to the formula

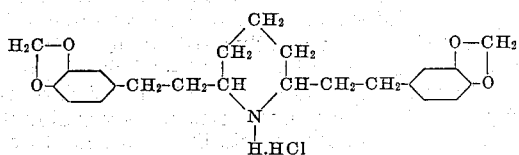

and is 2,6-di(3,4-methylenedioxy-phenethyl)-piperidine hydrochloride.

The free base liberated from this salt reacted with ethylene chlorohydrin methyl ether yields a product of the constitution

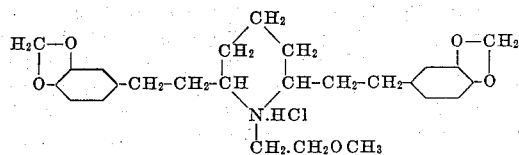

The same compound may be prepared by treating 2,6-di-(meta-para-methylenedioxy-phenylethenyl)-pyridine with methoxyethyl p-toluene sulfonate and then hydrogenating the resultant addition product, the reactions being carried out in accordance with the procedure given in Example 2.

The free base may be liberated from the salt by treatment thereof with an alkaline reagent.

*Example 4*

12 g. of 2,4-dimethyl pyridine, 26 g. of acetic anhydride, and 34 g. of anisic aldehyde are refluxed for twenty-four hours in an oil bath kept at 160°. The resulting solution is cooled, acidified, and steam-distilled until no odor of anisic aldehyde is noticeable any longer. The remainder is made alkaline and the precipitate formed transferred to a Buchner funnel, washed repeatedly with cold ethyl alcohol. Recrystallized three times from the same solvent it yields 3 g. of pure 2,4-di(p-methoxy-phenethenyl)-pyridine, melting at 205°.

3 g. of 2,4-di(p-methoxyphenethenyl)-pyridine is refluxed with 2 g. of ethyl toluene sulfonate for twenty-four hours in an oil bath kept at 160°. The resulting product solidifies on cooling. It yields after four recrystallizations from ethyl alcohol 4 g. of pure 2,4-di(p-methoxyphenethenyl)-pyridinium ethyl tosylate. Melting point over 230°.

4 g. of 2,4-di(p-methoxyphenethenyl)-pyridinium ethyl tosylate is hydrogenated in a mixture of acetic acid and ethyl alcohol, 1:1, using platinum oxide as catalyst. The catalyst is filtered, the solvent removed by vacuum distillation, and the remaining oil taken up in water, made alkaline with sodium carbonate. The free base is now extracted by means of ether, and into the dry ethereal solution hydrochloric acid gas is introduced until the reaction of the solution is strongly acidic. 1-ethyl-2,4-di(p-methoxyphenethyl)-piperidine hydrochloride is a sirup, and corresponds to the formula

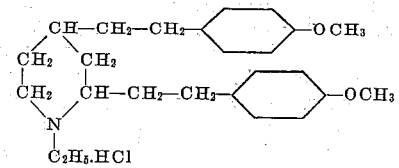

The free base may be liberated from the salt by treatment thereof with an alkaline reagent.

*Example 5*

10 g. of 2,6-di(p-methoxyphenethenyl)-pyridine obtained as described in Example 1 is reacted with 6.4 g. of ethyl p-toluene sulfonate by heating in an oil bath to 170–80° for twenty-four hours. On standing overnight 15.5 g. of 1-ethyl-2,6-di(p-methoxyphenethyl)-pyridinium p-toluene sulfonate crystallizes, which after two recrystallizations from alcohol melts at 140–45°.

14 g. of 1-ethyl-2,6-di(p-methoxyphenethyl)-pyridinium p-toluene sulfonate is dissolved in glacial acetic acid and hydrogenated under atmospheric pressure, using platinum oxide as a catalyst. In the course of two days 3730 cc. of hydrogen are consumed. The calculated amount for five mols of hydrogen is 3000 cc. When the hydrogen consumption has completely ceased, the mixture is filtered and the filtrate evaporated in vacuo. The residue is taken up in water, made alkaline with sodium carbonate, and extracted with ether. The ether layer is dried with solid sodium carbonate. It is then filtered and dry hydrochloric acid gas introduced until the reaction of the liquid becomes acidic to litmus. The hydrochloride thus obtained is first a suspension, then after standing a sirup. It is washed free of acid with ether, then dissolved in acetone and ether added until turbid. After long standing crystallization begins. Melting point is 184–6°. The material is 1-ethyl-2,6-di(p-methoxyphenethyl)-piperidine hydrochloride, and corresponds to the formula

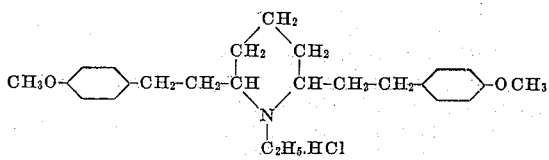

The free base may be liberated from the salt by treatment thereof with an alkaline reagent.

*Example 6*

15 g. of vanillin, 5 g. of 2,6-dimethyl pyridine and 10 g. of acetic anhydride are refluxed for sixteen hours in an oil bath kept at 150 to 160°. On cooling the reaction mixture deposits a yellow crystalline solid which after filtration is recrystallized several times from ethyl acetate, melting point 147–148°, analyzing as 2,6-di(p-hydroxy m-methoxy phenethyl)-pyridine.

1.4 g. of 2,6-di-p-hydroxy m-methoxy phenethyl)-pyridine is hydrogenated in the usual way in glacial acetic acid, platinum oxide being used as the catalyst. The theoretical hydrogen consumption is attained within two hours. The catalyst is now filtered and the solvent evaporated in vacuo, and the remaining acetic acid taken off with alcohol. The transformation into the hydrochloride is carried out in the usual way. Recrystallized from a mixture of alcohol and ether, the hydrochloride of 2,6-di(p-hydroxy m-methoxy phenethyl)-piperidine melts at 135–40°, and corresponds to the formula

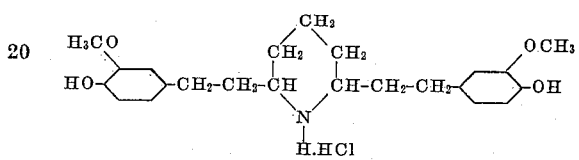

The free base may be obtained by the treatment of this salt with an alkaline reagent.

*Example 7*

5 g. of 2,6-di(p-methoxyphenethenyl)-pyridine is heated to 180–190° with 5 g. of benzyloxyethyl p-toluene sulfonate for twenty-four hours. After cooling, the dark brown sirup becomes partly solid. It is taken up in 75 cc. of boiling alcohol, which on standing deposits 3 g. of bright yellow needles, melting point 201–3°. The substance has the formula

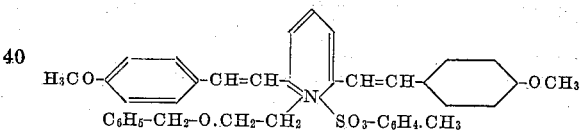

2.5 g. of the 1-benzyloxyethyl-2,6-di(p-methoxyphenethenyl)-pyridinium p-toluene sulfonate so obtained is dissolved in 10 cc. of an equal mixture of acetic acid and ethyl alcohol and hydrogenated at atmospheric pressure, using platinum oxide as catalyst. After five hours the hydrogen consumption is theoretical for 6 mols of hydrogen and ceases. The solvent is evaporated in vacuo and the residue made alkaline by means of sodium carbonate, extracted with ether, and the ether layer separated and dried over solid potassium carbonate. Upon passing of dry hydrogen chloride into this ether solution, a crystalline precipitate forms, which after filtration and two recrystallizations from hot alcohol, melts at 209–211°. This material is 1-hydroxyethyl-2,6-di(p-methoxyphenethyl)-piperidine hydrochloride and corresponds to the formula

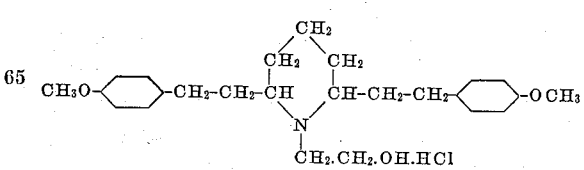

The free base may be obtained by the treatment of this salt with an alkaline reagent.

While we have described herein some embodiments of our invention, we wish it to be known that we do not intend to limit ourselves thereby, except within the scope of the appended claims.

We claim:

1. A compound selected from the group consisting of a compound of the structure

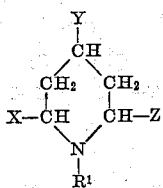

and its salts wherein $R^1$ is a radical selected from the group consisting of hydrogen, lower alkyl, hydroxyalkyl and alkoxyalkyl radicals, X is a radical selected from the group consisting of

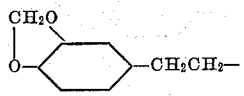

and

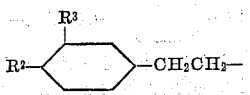

wherein one of $R^2$ and $R^3$ is a lower alkoxy radical and the other a radical selected from the group consisting of hydrogen, lower alkoxy and hydroxy radicals, and one of the radicals Y and Z is hydrogen and the other the same radical as the radical X.

2. A compound selected from the group consisting of a compound of the structure

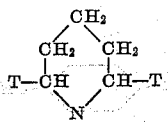

and its salts wherein $R^1$ is a radical selected from the group consisting of hydrogen, lower alkyl, hydroxyalkyl and alkoxyalkyl radicals and T is a radical selected from the group consisting of

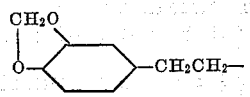

and

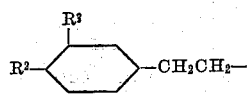

wherein one of $R^2$ and $R^3$ is a lower alkoxy radical and the other a radical selected from the group consisting of hydrogen, lower alkoxy and hydroxy radicals.

3. A compound selected from the group consisting of a compound of the structure

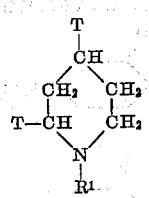

and its salts wherein $R^1$ is a radical selected from the group consisting of hydrogen, lower alkyl, hydroxyalkyl and alkoxyalkyl radicals and T is a radical selected from the group consisting of

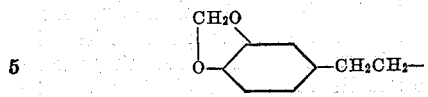

and

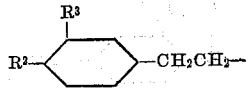

wherein one of $R^2$ and $R^3$ is a lower alkoxy radical and the other a radical selected from the group consisting of hydrogen, lower alkoxy, and hydroxy radicals.

4. A compound selected from the group consisting of a compound of the structure

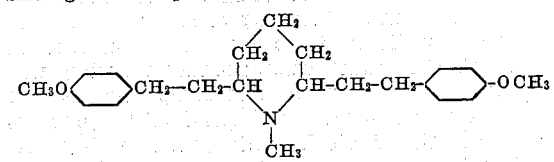

and its salts.

5. A compound selected from the group consisting of a compound of the structure

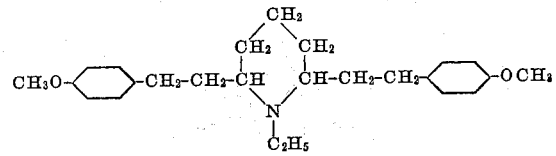

and its salts.

6. A process for the preparation of compounds of the structure

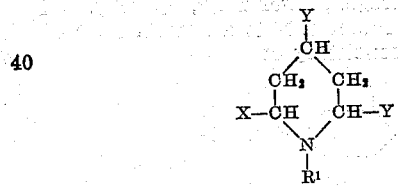

wherein $R^1$ is a radical selected from the group consisting of hydrogen, lower alkyl, hydroxyalkyl, and alkoxyalkyl radicals, one of the radicals Y and Z is hydrogen and the other radical and X are selected from the group consisting of

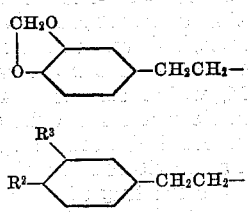

and

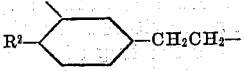

wherein one of $R^2$ and $R^3$ is a lower alkoxy radical and the other a radical selected from the group consisting of hydrogen, lower alkoxy, and hydroxy radicals, which comprises reacting a dimethyl pyridine selected from the group consisting of 2,4-dimethyl pyridine and 2,6-dimethyl pyridine with a substituted benzaldehyde selected from the group consisting of

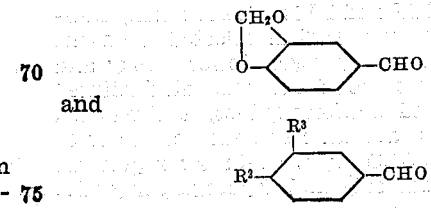

and

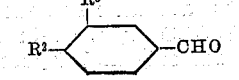

wherein one of R² and R³ is a lower alkoxy radical and the other a radical selected from the group consisting of hydrogen, lower alkoxy and hydroxy radicals to form the mono-substituted phenethenyl condensation product, reacting such product with a substituted benzaldehyde selected from the group consisting of

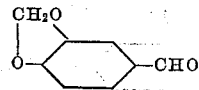

and

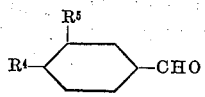

wherein one of R⁴ and R⁵ is a lower alkoxy radical and the other a radical selected from the group consisting of hydrogen, lower alkoxy and hydroxy radicals to form the disubstituted phenethenyl condensation product, reacting such product with an aromatic sulfonic acid ester of the formula R¹—OSO₂Ar wherein Ar represents an aromatic radical, and hydrogenating the product in the presence of a hydrogenation catalyst.

7. A process for the manufacture of compounds of the formula

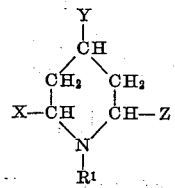

wherein R¹ is a radical selected from the group consisting of hydrogen, lower alkyl, hydroxyalkyl and alkoxyalkyl radicals, X is a radical selected from the group consisting of

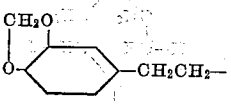

and

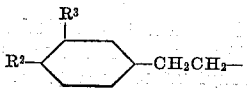

wherein one of R² and R³ is a lower alkoxy radical and the other a radical selected from the group consisting of hydrogen, lower alkoxy and hydroxy radicals, and one of the radicals Y and Z is hydrogen and the other the same radical as the radical X, which comprises reacting a dimethyl pyridine selected from the group consisting of 2,4-dimethyl pyridine and 2,6-dimethyl pyridine with a substituted benzaldehyde selected from the group consisting of

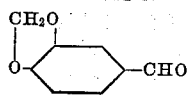

and

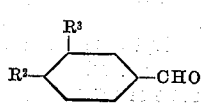

wherein one of R² and R³ is a lower alkoxy radical and the other a radical selected from the group consisting of hydrogen, lower alkoxy and hydroxy radicals, to form the disubstituted phenethenyl condensation product, reacting such product with an aromatic sulfonic acid ester of the formula R¹OSO₂Ar, wherein Ar represents an aromatic radical, and hydrogenating the product in the presence of a hydrogenation catalyst.

8. A process for the manufacture of compounds of the formula

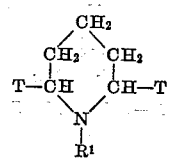

wherein R¹ is a radical selected from the group consisting of hydrogen, lower alkyl, hydroxyalkyl and alkoxyalkyl radicals and T is a radical selected from the group consisting of

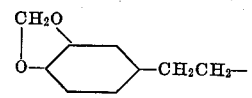

and

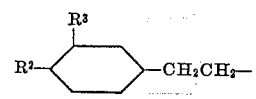

wherein one of R² and R³ is a lower alkoxy radical and the other a radical selected from the group consisting of hydrogen, lower alkoxy and hydroxy radicals, which comprises reacting 2,6-dimethyl pyridine with a substituted benzaldehyde selected from the group consisting of

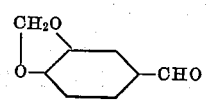

and

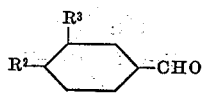

wherein one of R² and R³ is a lower alkoxy radical and the other a radical selected from the group consisting of hydrogen, lower alkoxy and hydroxy radicals, to form the disubstituted phenethenyl condensation product, reacting such product with an aromatic sulfonic acid ester of the formula R¹OSO₃Ar, wherein Ar represents an aromatic radical, and hydrogenating the product in the presence of a hydrogenation catalyst.

9. A process for the manufacture of compounds of the formula

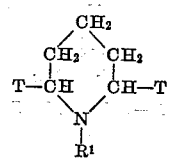

wherein R¹ is a radical selected from the group consisting of hydrogen, lower alkyl, hydroxyalkyl and alkoxyalkyl radicals and T is a radical selected from the group consisting of

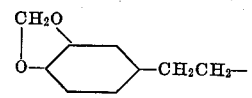

and

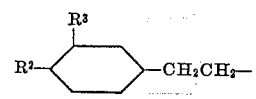

wherein one of R² and R³ is a lower alkoxy radical and the other a radical selected from the group consisting of hydrogen, lower alkyl, lower alkoxy, and hydroxy radicals, which comprises reacting 2,4-dimethyl pyridine with a substituted benzaldehyde selected from the group consisting of

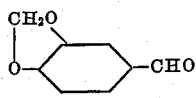

and

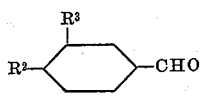

wherein one of $R^2$ and $R^3$ is a lower alkoxy radical and the other a radical selected from the group consisting of hydrogen, lower alkyl, lower alkoxy and hydroxy radicals, to form the disubstituted phenethenyl condensation product, reacting such product with an aromatic sulfonic acid ester of the formula $R^1OSO_2Ar$, wherein Ar represents an aromatic radical, and hydrogenating the product in the presence of a hydrogenation catalyst.

10. A process for the manufacture of a compound of the structure

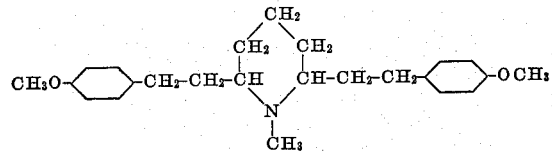

which comprises reacting anisaldehyde with 2,6-dimethyl pyridine to form the di(p-methoxyphenethenyl)-pyridine, reacting the latter with methyl p-toluene sulfonate to form the corresponding quaternary ammonium product and hydrogenating in the presence of a hydrogenation catalyst.

11. The process for the manufacture of a compound of the structure

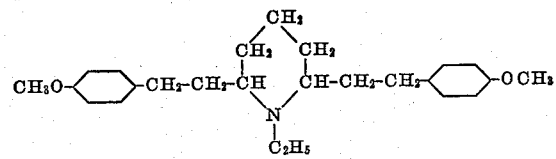

which comprises reacting anisaldehyde with 2,4-dimethyl pyridine to form the di(p-methoxyphenethenyl)-piperidine, reacting the latter with ethyl p-toluene sulfonate to form the corresponding quaternary ammonium product and hydrogenating in the presence of a hydrogenation catalyst.

12. A compound selected from the group consisting of a substance having the structure

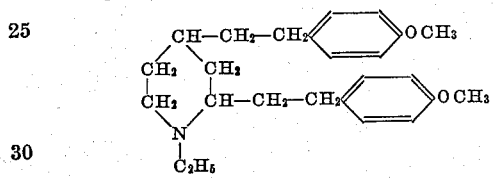

and of its salts.

WERNER FREUDENBERG.
JOHN LEE.